(12) United States Patent
Warren

(10) Patent No.: US 9,373,200 B2
(45) Date of Patent: Jun. 21, 2016

(54) MONITORING VEHICLE USAGE

(71) Applicant: Vivint, Inc., Provo, UT (US)

(72) Inventor: Jeremy B. Warren, Draper, UT (US)

(73) Assignee: Vivint, Inc., Provo, UT (US)

(*) Notice: Subject to any disclaimer, the term of this patent is extended or adjusted under 35 U.S.C. 154(b) by 0 days.

(21) Appl. No.: 14/298,667

(22) Filed: Jun. 6, 2014

(65) Prior Publication Data

US 2015/0356795 A1    Dec. 10, 2015

(51) Int. Cl.
| | |
|---|---|
| *H04W 4/00* | (2009.01) |
| *G07C 5/00* | (2006.01) |
| *B60W 40/09* | (2012.01) |

(52) U.S. Cl.
CPC ............ *G07C 5/008* (2013.01); *B60W 40/09* (2013.01); *B60W 2510/18* (2013.01); *B60W 2520/10* (2013.01); *B60W 2540/28* (2013.01); *B60W 2540/30* (2013.01)

(58) Field of Classification Search
CPC .. G08G 1/20; H04M 1/6091; H04M 2250/02; H04M 2250/10; H04W 4/027; B60W 2540/28; B60W 2550/22; G08B 25/00
USPC .......... 701/31.5, 1, 31.3, 33.4; 455/456.1, 455/456.3, 556.1, 569.2; 340/425.5, 436, 340/437, 463, 465–467
See application file for complete search history.

(56) References Cited

U.S. PATENT DOCUMENTS

| | | | | |
|---|---|---|---|---|
| 9,031,762 | B1* | 5/2015 | Bell | G06F 17/00 345/173 |
| 2009/0079555 | A1* | 3/2009 | Aguirre De Carcer | G07C 5/008 340/441 |
| 2010/0210254 | A1* | 8/2010 | Kelly | G07C 5/008 455/418 |
| 2013/0096731 | A1* | 4/2013 | Tamari et al. | 701/1 |
| 2013/0150004 | A1* | 6/2013 | Rosen | 455/414.1 |
| 2014/0113619 | A1* | 4/2014 | Tibbitts et al. | 455/419 |

* cited by examiner

*Primary Examiner* — Dalena Tran
(74) *Attorney, Agent, or Firm* — Holland & Hart LLP

(57) ABSTRACT

A method for monitoring vehicle usage is described. In one embodiment, the method includes detecting a vehicle event and detecting a query from a mobile device. The query includes a Wi-Fi probe request or Bluetooth inquiry. The method includes identifying a mobile device identifier from the query and associating the mobile device identifier with the vehicle event.

20 Claims, 7 Drawing Sheets

| Vehicle Data 405 | | |
|---|---|---|
| Mobile Device ID 410 | Associated Vehicle Events | Identity |
| 88:53:95:4b:05:02 415 | Excessive Speed, Excessive Braking | R. Smith |
| 49-015420-323751 | Normal operation | B. Jones |
| 88:53:95:4b:08:07 | Excessive Acceleration, Excessive RPM | S. Davis |
| MD658LL/A | Excessive Audio System Volume | Unknown |
| 88846THXH7H | Excessive G-Force, Excessive Speed | J. Brown |

400

| Vehicle Data | | |
|---|---|---|
| Mobile Device ID | Associated Vehicle Events | Identity |
| 88:53:95:4b:05:02 | Excessive Speed, Excessive Braking | R. Smith |
| 49-015420-323751 | Normal operation | B. Jones |
| 88:53:95:4b:08:07 | Excessive Acceleration, Excessive RPM | S. Davis |
| MD658LL/A | Excessive Audio System Volume | Unknown |
| 88846THXH7H | Excessive G-Force, Excessive Speed | J. Brown |

*FIG. 4*

MONITORING VEHICLE USAGE

BACKGROUND

Advancements in media delivery systems and data-related technologies continue to increase at a rapid pace. Increasing demand for accessible data has influenced the advances made to data-related technologies. Computer systems have increasingly become an integral part of data creation, data usage, and data storage. Computer systems may be used to carry out several data-related functions. The wide-spread access to data has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of and continued advancements in data monitoring technologies. For example, advancements in mobile devices allow users to monitor a home or business from anywhere in the world.

SUMMARY

According to at least one embodiment, a method for monitoring vehicle usage is described. In one embodiment, the method may include detecting a vehicle event and detecting a query from a mobile device. The query may include a Wi-Fi probe request or Bluetooth inquiry. The method may include identifying a mobile device identifier from the query and associating the mobile device identifier with the vehicle event. In some cases, the vehicle event is detected in conjunction with an on-board diagnostic (OBD) connector.

In some embodiments, the mobile device identifier includes any combination of a device serial number, international mobile equipment identity (IMEI) number, mobile equipment identifier (MEID), cellular data number (CDN), integrated circuit card identifier (ICCID), Wi-Fi media access control (MAC) address, BLUETOOTH® MAC address, BLUETOOTH® global identifier, carrier information, mobile device model information, and a list of service set identifiers (SSIDs). In some cases, the vehicle event includes any combination of vehicle speed, vehicle acceleration, vehicle deceleration, vehicle braking, vehicle gravitational force (g-force), vehicle seat belt use, distance traveled, engine performance, vehicle occupancy, and vehicle location.

In one embodiment, the method may include determining whether the mobile device is within the vehicle. Determining whether the mobile device is within the vehicle may include any combination of satisfying a quantity of queries threshold, satisfying a query timing threshold, and satisfying a signal strength threshold. In some cases, the method includes identifying excessive behavior from the vehicle event. The excessive behavior may include any combination of satisfying a speed threshold, satisfying an acceleration threshold, satisfying a deceleration threshold, satisfying a braking threshold, satisfying a g-force threshold, satisfying a revolutions per minute (RPM) threshold, and satisfying an audio system volume threshold.

In some cases, the method may include associating the mobile device identifier with the excessive behavior and/or associating the mobile device identifier with an identity of a vehicle occupant. Upon detecting a predetermined mobile device identifier, an operation of the vehicle may be altered and/or an alert notification may be generated. In one embodiment, the method include storing the mobile device identifier and data associated with the mobile device identifier in a cloud data service. The mobile device identifier and associations of the mobile device identifier may be communicated to the cloud data service via a cellular link.

A computing device configured for monitoring vehicle usage is also described. The computing device may include a processor and memory in electronic communication with the processor. The memory may store computer executable instructions that when executed by the processor cause the processor to perform the steps of detecting a vehicle event, detecting a query from a mobile device, identifying a mobile device identifier from the query, and associating the mobile device identifier with the vehicle event. In some cases, the query include a Wi-Fi probe request or Bluetooth inquiry.

A non-transitory computer-readable storage medium storing computer executable instructions is also described. When the instructions are executed by a processor, the execution of the instructions may cause the processor to perform the steps of detecting a vehicle event, detecting a query from a mobile device, identifying a mobile device identifier from the query, and associating the mobile device identifier with the vehicle event. In some cases, the query include a Wi-Fi probe request or Bluetooth inquiry.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a block diagram illustrating one example of vehicle data gathered from monitoring vehicle usage;

Figure 1:
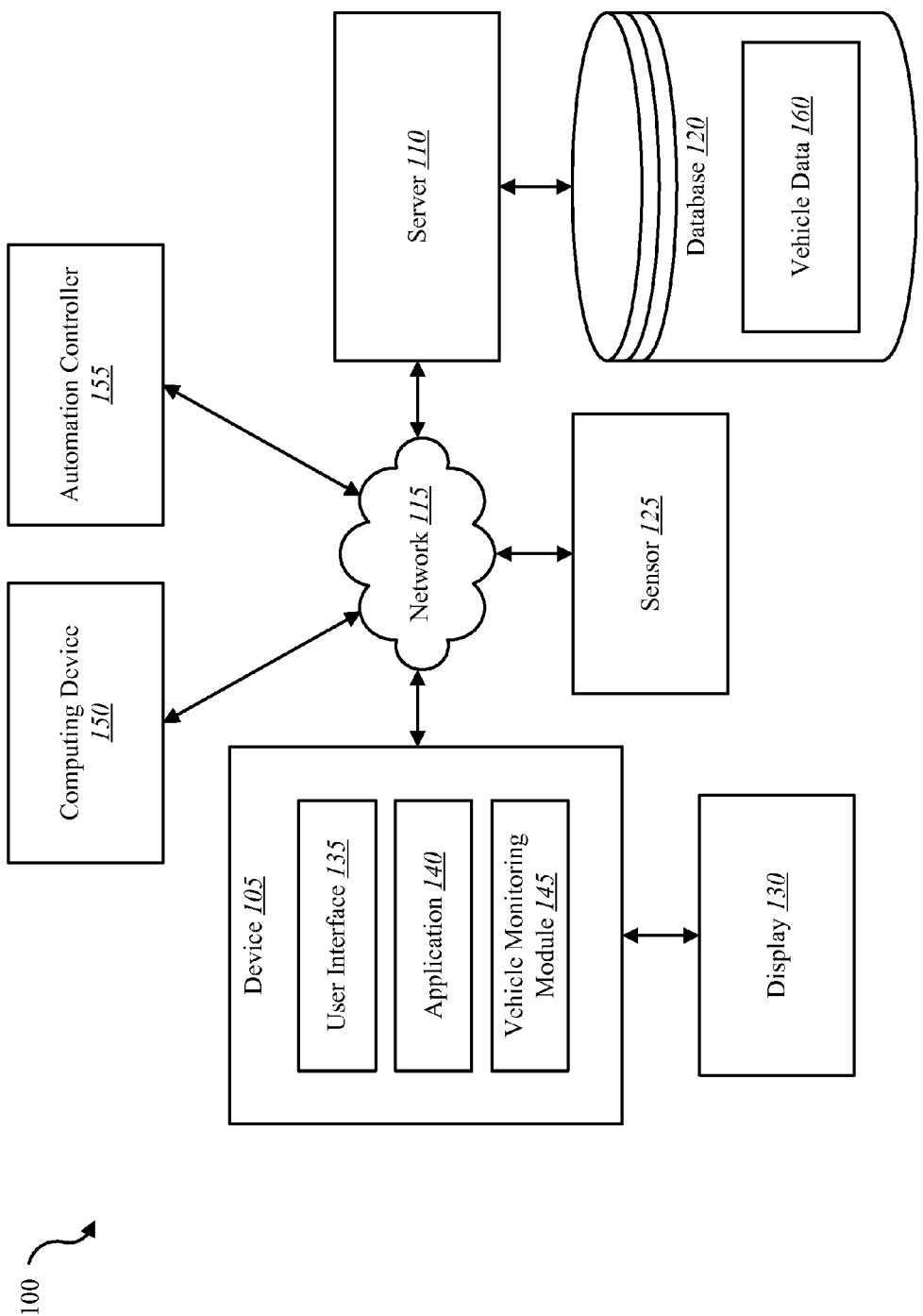
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to vehicle monitoring systems. More specifically, the systems and methods described herein relate to monitoring vehicle usage in relation to detectable vehicle events. Some embodiments of the systems and methods described herein relate to monitoring vehicle usage in relation to detectable vehicle events such as vehicle speed, vehicle seat belt use, vehicle location, vehicle gravitational force (g-force), vehicle occupancy, occupant identity, and the like.

As one example, parents of children that are relatively new to driving realize that the driving behavior of their children may be influenced through peer pressure. When the child is driving with the parent, the child may be cautious and adhere to motor vehicle laws and follow the standards of safe driving. When the child is driving with certain peers, the child's driving behavior may become excessive. For instance, the child may feel pressured to exceed speed limits, and take others risks that the child would not have otherwise taken. On the other hand, the child's driving behavior may be acceptable when driving with other peers. The parent may use vehicle data devices to gather data regarding the child's driving behavior. Such devices may tell the parent if the driving behavior of the child needs correcting. The parent, however, may not know the underlying circumstances of the excessive behavior. Accordingly, the present systems and methods may indicate to the parent not only excessive behavior, but also identification of the vehicle occupants when the excessive behavior occurs. If the parent knew when the child was more likely to drive excessively, such as when certain peers are occupants when the child is driving the vehicle, then the parent may be notified and be enabled to use this information to resolve the issue. In one embodiment, the present systems and methods may be performed in conjunction with a vehicle on-board diagnostic system, a vehicle computing system, a data communication system, and/or an on-board diagnostics dongle. On-board diagnostics (OBD) is an automotive term referring to a vehicle's self-diagnostic and reporting capability. OBD systems provide access to the status of various vehicle systems. Modern OBD implementations may use a standardized digital communications port to provide real-time data in addition to a standardized series of diagnostic trouble codes (DTCs), which allow one to rapidly identify and remedy malfunctions within the vehicle.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, a sensor 125, a display 130, a computing device 150, an automation controller 155, and a network 115 that allows the device 105, the server 110, the computing device 150, automation controller 155, and sensor 125 to communicate with one another.

In some embodiments, device 105 may be part of one or more components of a vehicle. Examples of the device 105 may include any combination of OBD dongles, vehicle computer systems, mobile devices, smart phones, personal computing devices, computers, laptops, desktops, servers, and the like. In some cases, device 105 may include a vehicle diagnostic system integrated within device 105 and/or may be in communication with a vehicle diagnostic system. In some embodiments, device 105 may include one or more processors, memory, storage devices, and/or data communication devices. Device 105 may be part of a vehicle computer system and/or in communication with a vehicle computer system.

Examples of automation controller 155 may include any device configured to control a building such as a home, a business, a government facility, etc. Accordingly, examples of automation controller 155 include any combination of a dedicated building automation computing device (e.g., wall-mounted controller), a personal computing device (e.g., laptop, desktop, etc.), a mobile computing device (e.g., tablet computing device, smartphone, etc.), and the like. In some cases, device 105 may be configured to send data to automation controller 155. For example, vehicle data captured via device 105 may be sent and made available for display on a display of automation controller 155.

Examples of computing device 150 may include any combination of a mobile computing device, a laptop, a desktop, a server, a media set top box, etc. Examples of server 110 may include any combination of a data server, a cloud server, a server associated with an automation service provider, proxy server, mail server, web server, application server, database server, communications server, file server, home server, mobile server, name server, and the like.

Examples of sensor 125 may include any combination of a speed sensor, acceleration sensor, deceleration sensor, gravitational force (g-force) sensor, braking sensor, seat belt sensor, odometer sensor, engine temperature sensor, engine oil level sensor, engine oil temperature sensor, engine timing sensor, engine revolutions per minute (RPM) sensor, fuel injector sensor, fuel use sensor, miles per gallon (MPG) sensor, seat occupancy sensor, location sensor (e.g., global positioning system (GPS), wireless triangulation, etc.), audio decibel sensor, camera sensor, forced entry sensor, shock sensor, proximity sensor, boundary sensor, light beam sensor, glass break sensor, door sensor, window sensor, other types of sensors, actuators, or combinations thereof. Sensor 125 may represent one or more separate sensors or a combination of two or more sensors in a single device. For example, sensor 125 may represent one or more camera sensors and one or more engine data sensors connected to environment 100. Sensor 125 may be integrated with an identity detection system such as a facial recognition system and/or a voice recognition system. Although sensor 125 is depicted as connecting to device 105 over network 115, in some embodiments, sensor 125 may connect directly to or within device 105.

Additionally, or alternatively, sensor 125 may be integrated with a vehicle system, such as a car stereo system, vehicle GPS system, vehicle climate system. For example, sensor 125 may be installed on the dash of a vehicle. In some cases, sensor 125 may include a camera installed in a rear-view mirror in addition to other cameras. Sensor 125 may include a wireless communication sensor 125 configured to send and receive data and/or information to and from one or more devices in environment 100. Additionally, or alternatively, sensor 125 may include a GPS sensor to enable sensor 125 to track a location of the vehicle. In some embodiments, sensor 125 may include a forced entry sensor (e.g., shock sensor, glass break sensor, etc.) to enable sensor 125 to detect an attempt to break into the vehicle. Sensor 125 may include a siren to sound an alarm, etc.

In some configurations, the device 105 may include a user interface 135, application 140, and vehicle monitoring module 145. Although the components of the device 105 are depicted as being internal to the device 105, it is understood that one or more of the components may be external to the device 105 and connect to device 105 through wired and/or wireless connections. In some embodiments, application 140 may be installed on computing device 150 in order to allow a user to interface with a function of device 105, vehicle monitoring module 145, automation controller 155, and/or server 110.

In some embodiments, device 105 may communicate with server 110 via network 115. Example of networks 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include a vehicle monitoring module 145. For example, device 105 may include application 140 that allows device 105 to interface with automation controller 155 via vehicle monitoring module 145 located on another device such as computing device 150 and/or server 110. In some embodiments, device 105, automation controller 155, and server 110 may include a vehicle monitoring module 145 where at least a portion of the functions of vehicle monitoring module 145 are performed separately and/or concurrently on device 105, automation controller 155, and/or server 110. Likewise, in some embodiments, a user may access the functions of device 105 and/or automation controller 155 (directly or through device 105 via vehicle monitoring module 145) from computing device 150. For example, in some embodiments, computing device 150 includes a mobile application that interfaces with one or more functions of device 105, automation controller 155, vehicle monitoring module 145, and/or server 110.

In some embodiments, server 110 may be coupled to database 120. Database 120 may be internal or external to the server 110. In one example, device 105 may be coupled directly to database 120, database 120 being internal or external to device 105. Database 120 may include vehicle data 160. For example, device 105 may access vehicle data 160 in database 120 over network 115 via server 110. Vehicle data 160 may include data generated by sensor 125. For example, vehicle data 160 may include data regarding vehicle performance, vehicle speed, vehicle acceleration, and the like. Vehicle data 160 may include mobile device identifiers detected by device 105 via vehicle monitoring module 145. In some cases, vehicle data 160 may include associations between vehicle data, excessive driving data, mobile device identifiers, identities of vehicle occupants, and the like. Accordingly, vehicle monitoring module 145 may enable a user to track vehicle data, excessive driving data, and mobile device identifiers indicating mobile devices that were detected as being within the vehicle at the time the vehicle data was detected. Further details regarding the vehicle monitoring module 145 are discussed below.

Figure 2:
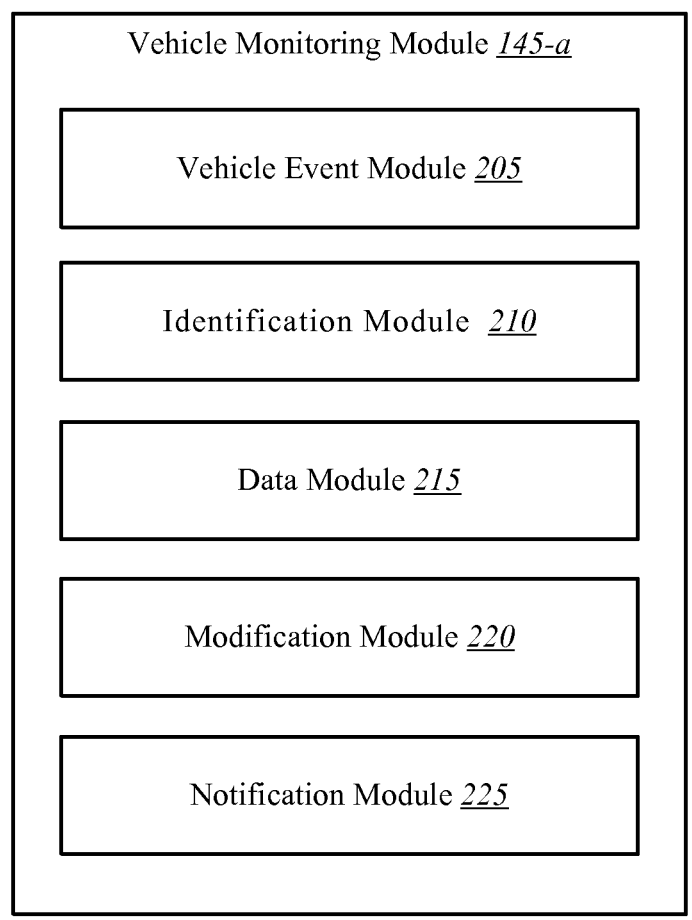
FIG. 2 is a block diagram illustrating one example of a vehicle monitoring module.

FIG. 2 is a block diagram illustrating one example of a vehicle monitoring module 145-*a*. Vehicle monitoring module 145-*a* may be one example of vehicle monitoring module 145 depicted in FIG. 1. As depicted, vehicle monitoring module 145-*a* may include vehicle event module 205, an identification module 210, data module 215, modification module 220, and a notification module 225.

In one embodiment, vehicle event module 205 may detect a vehicle event. The vehicle event may include any combination of vehicle speed, vehicle acceleration, vehicle deceleration, vehicle braking, vehicle gravitational force (g-force), vehicle seat belt use, distance traveled, engine performance, vehicle occupancy, and vehicle location. Vehicle location may be determined by any combination of radio direction finding, radio triangulation, terrestrial radio positioning systems utilizing a Low Frequency (LF) switched packet radio network, local positioning system (LPS), and GPS. Engine performance may include any combination of fuel consumption, miles per gallon of fuel, oil temperature, engine revolutions per minute (RPM), engine timing performance, and the like.

In some cases, the vehicle event is detected in conjunction with an on-board diagnostic (OBD) connector. In some embodiments, vehicle event module 205 may identify excessive behavior from the vehicle event. Identifying excessive behavior may include any combination of satisfying a speed threshold, satisfying an acceleration threshold, satisfying a deceleration threshold, satisfying a braking threshold (e.g., hard braking events such as a deceleration of 0.40 g or greater), satisfying a g-force threshold, satisfying a revolutions per minute (RPM) threshold, and satisfying an audio system volume threshold. For example, vehicle event module 205 may compare detected vehicle events to one or more thresholds. For instance, one speed threshold may include traveling at a speed above 70 miles per hour. When vehicle event module 205 detects the vehicle traveling at and/or above 70 miles per hour, vehicle event module 205 may detect the speed and identify that the detected speed satisfies at least one speed threshold. In some cases, the one or more thresholds may be location dependent. For example, a speed threshold of 70 miles per hour may apply when the vehicle is detected as operating on an interstate or highway, and a speed threshold of 30 miles per hour may apply when the vehicle is detected as operating within a residential area.

In one embodiment, identification module 210 may detect a query from a mobile device, the query comprising a Wi-Fi probe request or BLUETOOTH® inquiry. A mobile device may generate a Wi-Fi probe request for the purpose of detecting external Wi-Fi access points, base stations, nodes, etc. Typically, a Wi-Fi device within range of the mobile device may reply with a probe response. Likewise, a BLUETOOTH® device may respond to the BLUETOOTH® inquiry with an inquiry response. Mobile device identifier detection may include passive and/or active scanning. Accordingly, using active scanning, identification module 210 may actively scan for mobile devices with Wi-Fi enabled, listening for information provided by the mobile device and/or requesting information from the mobile device. Additionally, or alternatively, using passive scanning, identification module 210 may wait for a mobile device to send a query (e.g., Wi-Fi probe request and/or BLUETOOTH® inquiry) and gather information from the query.

In some embodiments, identification module 210 may only include those components used to identify identification information associated with the device from the query. For example, the identification module 210 may include and/or make use of a stripped-down version of a Wi-Fi access point and/or BLUETOOTH® access point, such as an access point that includes only an antenna, a decoder, a processor, and memory. Thus, in some embodiments, other elements used by access points to receive and send data from a back end to a user end device may be absent from the identification module 210. Alternatively, in some cases, the identification module 210 includes and/or makes use of a fully-functional access point. Accordingly, in some embodiments, identification module 210 may identify a mobile device identifier from the query. The mobile device identifier may include any combination of a device serial number, international mobile equipment identity (IMEI) number, mobile equipment identifier (MEID), cellular data number (CDN), integrated circuit card identifier (ICCID), Wi-Fi media access control (MAC) address, BLUETOOTH® MAC address, BLUETOOTH® global identifier, carrier information, mobile device model information, and a list of service set identifiers (SSIDs). In one embodiment, identification module 210 may identify an occupant of the vehicle. Identification module 210 may use any combination of voice recognition, facial recognition, data entry, and the like to identify an occupant of the vehicle. In some cases, identification module 210 may identify an occupant using a previously established association between a mobile device identifier and an identity of an occupant.

In one embodiment, identification module 210 may determine whether the mobile device is within the vehicle. In some cases, identification module 210 may determine whether the mobile device is within the vehicle via any combination of satisfying a quantity of queries threshold, satisfying a query timing threshold, and satisfying a signal strength threshold. For example, if the query includes a predetermined number of queries, then the query may satisfy a quantity of queries threshold. Additionally, or alternatively, if the query includes multiple queries over a predetermined time threshold, then the query may satisfy a query timing threshold. Additionally, or alternatively, if a signal of the query satisfies a minimum signal strength, then the query may satisfy a signal strength threshold. In some embodiments, if a variation in the signal strength over time varies within a predetermined maximum variation, then the query may satisfy a signal strength threshold. For example, with a maximum variation of 1 decibel (dB), if the initial signal strength of a query is 3 dB and the signal strength remains between 2.1 dB and 3.9 dB, then the most the query varies is 0.9 dB, which is within the 1 dB threshold, and so the signal strength threshold may be satisfied. Additionally, or alternatively, a signal strength of the query may be measured while the engine is idle and/or when the vehicle is in motion. In some cases, the signal strength while idling may be compared to the signal strength while in motion. If the signal strength remains within a predetermined signal strength range, then the query may satisfy a signal strength threshold. Additionally, or alternatively, if signal strength remains within a predetermined signal strength range while the vehicle is in motion, then the query may satisfy a signal strength threshold.

In one embodiment, data module 215 may associate the mobile device identifier with a vehicle event. For example, the data module 215 may associate that mobile device identifier X and mobile device identifier Y were detected when the vehicle was driven from point A to point B. In some cases, data module 215 may associate the mobile device identifier with excessive behavior identified from the vehicle events. Thus, when excessive speed is detected, data module 215 may associate mobile device identifiers X and Y with the excessive speed. In some cases, data module 215 may associate the mobile device identifier with an identity of a vehicle occupant.

In one embodiment, data module 215 may store the mobile device identifier and data associated with the mobile device identifier in a cloud data service. For example, the data module 215 may associate an identity with the mobile device identifier. Thus, the data module 215 may transmit the identity and mobile device identifier to the cloud data service for storage and retrieval. In some cases, data module 215 may send to the cloud data service associations between the mobile device identifier, vehicle occupant identity, detected vehicle data, and/or excessive behavior. In some cases, the mobile device identifier and associations of the mobile device identifier may be communicated to the cloud data service via a cellular link. For example, the vehicle may include an integrated cellular communication device. The data module 215 may utilize the vehicle's cellular-enabled device to communicate the mobile device and vehicle-related data to the cloud data service. Additionally, or alternatively, vehicle monitoring module 145-a and/or device 105 may include a cellular communication device. Accordingly, patterns may be detectable regarding the stored associations of vehicle data, excessive behavior, and mobile device identifiers. For example, a parent may want to track the driving behavior of a child. When the child drives with the parent, the vehicle data may indicate no excessive behavior. When the child drives with one friend, however, the vehicle data may indicate at least some excessive behavior, while when the child drives with another friend, again the vehicle data indicates no excessive behavior. Accordingly, the parent may want to be notified when certain people are in the vehicle with the parent's child.

Upon detecting a predetermined mobile device identifier, notification module 225 may generate an alert notification. The notification may be sent in real-time upon detecting notification triggers (e.g., vehicle events, mobile device identifiers, etc.). The notification may include any combination of an identifier of a mobile device detected within the vehicle, an identity associated with the identifier of the mobile device, a vehicle event history report associated with the identifier of the mobile device, an image captured by a camera on the vehicle, and the like. Additionally, or alternatively, upon detecting a predetermined mobile device identifier, indicating a certain person is within the vehicle, modification module 220 may alter an operation of the vehicle. For example, in some cases, modification module 220 may immobilize the vehicle. In some cases, modification module 220 may govern or limit the speed of the vehicle. In some embodiments, modification module 220 may conditionally immobilize the vehicle until one or more conditions are met. For example, the modification module 220 may immobilize the vehicle until seat belts are worn, until an identifiable occupant leaves the vehicle, until an identifiable occupant enters the vehicle, until a predetermined user is notified, until a predetermined user authorizes use of the vehicle, etc.

Figure 3:
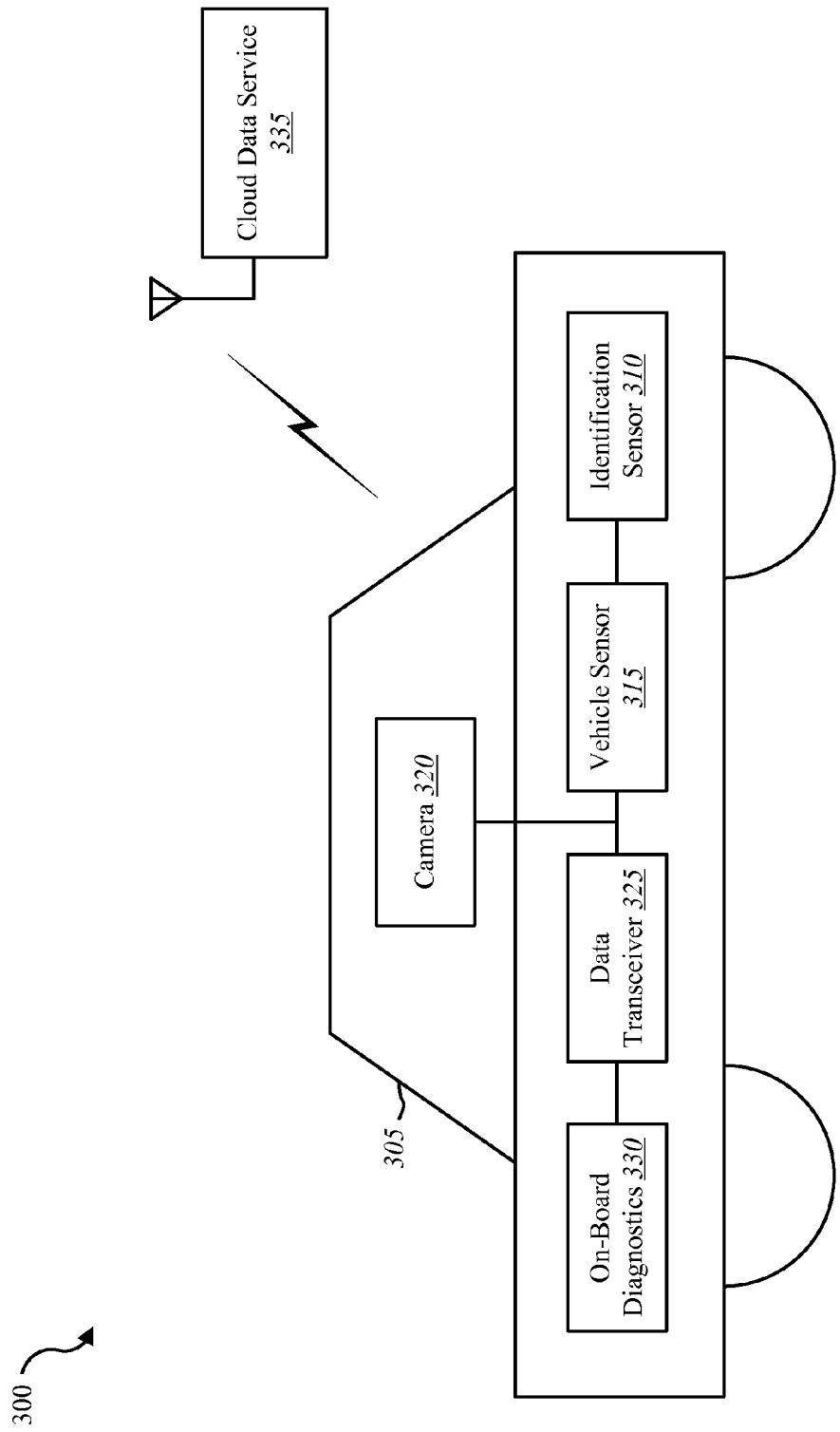
FIG. 3 is a block diagram illustrating one example of an environment for monitoring vehicle usage for the timely notification of vehicle-related events.

FIG. 3 is a block diagram illustrating one example of an environment 300 for monitoring vehicle usage for the timely notification of vehicle-related events. As depicted, a vehicle 305 may be configured as depicted to include an identification sensor 310, a vehicle sensor 315, a camera 320, a data transceiver 325, and on-board diagnostics 330. As depicted, each element 310-330 within vehicle 305 may be configured to communicate over a bus, such that each element 310-330 may communicate with each other. In some cases, each element 310-330 may be elements of a single device. Alternatively, one or more of the elements 310-330 may be part of a separate device. Any combination of elements 310-330 may be included in and/or work in conjunction with vehicle monitoring module 145-a.

In one embodiment, the identification sensor 310 may identify a mobile device identifier, such as a WiFi MAC address and/or a BLUETOOTH® MAC address. For example, an occupant of vehicle 305 may carry a smartphone that communicates a query for available Wi-Fi and/or BLUETOOTH® access points. Accordingly, identification sensor 310 may identify information in the query that identifies the smartphone. In some cases, camera 320 may capture one or more images of an interior view of vehicle 305. In some cases, vehicle 305 may include two or more cameras to capture different views. In some embodiments, identification sensor 310 may associate an image captured by camera 320 with identified mobile device identifiers.

In one embodiment, vehicle sensor 315 may identify one or more vehicle events of vehicle 305, such as vehicle occupancy, seat belt use, vehicle speed, vehicle acceleration, vehicle deceleration, etc. On-board diagnostics 330 may include a connector that connects to an OBD port of vehicle 305. On-board diagnostics 330 may include one or more processors, memory, and a storage device. Accordingly, on-board diagnostics 330 may process the detected vehicle events and/or the identified mobile device identifiers. For example, on-board diagnostics 330 may associate a vehicle event with a mobile device identifier. Data transceiver 325 may communicate data such as detected vehicle events, captured images, identified mobile device identifiers, and/or associations between such data to an external database (e.g., database 120). For example, database 120 may be a database hosted on cloud data service 335.

FIG. 4 is a block diagram illustrating one example of vehicle data 400 gathered from monitoring vehicle usage. Vehicle data 400 may be one example of vehicle data 160 depicted in FIG. 1. Additionally, or alternatively, vehicle data 400 may be one example of the data of FIG. 3 detected and gathered at vehicle 305 and communicated to cloud data service 335.

As depicted, vehicle data 400 may organized with a title bar 405 indicating that the data displayed includes "Vehicle Data." The vehicle data may be sorted according to displayed headers 410. Some examples of headers 410 may include "Mobile Device ID," "Associated Vehicle Events," and "Identity." As illustrated, vehicle data 400 may include data entries 415. For example, a first data entry from data entries 415 may include a mobile device identifier of "88:53:95:4b:05:02," which may represent a Wi-Fi MAC address, associated vehicle events of "Excessive Speed" and "Excessive Braking" and an identity of "R. Smith" being associated with the mobile device identifier. Data entries 415 may also include entries for other mobile device identifiers such as BLUETOOTH® MAC addresses (e.g., "88:53:95:4b:05:02"), IMEI number (e.g., "49-015420-323751"), model number (e.g., "MD658LL/A"), serial number (e.g., "88846THXH7H"), and the like. If no excessive vehicle events are detected in association with a mobile device identifier, vehicle data 400 may indicate this by stating, for example, "Normal operation" as illustrated. Likewise, if a mobile device identifier is not associated with a known identity, vehicle data 400 may indicate this by stating, for example, "Unknown" as illustrated.

Figure 5:
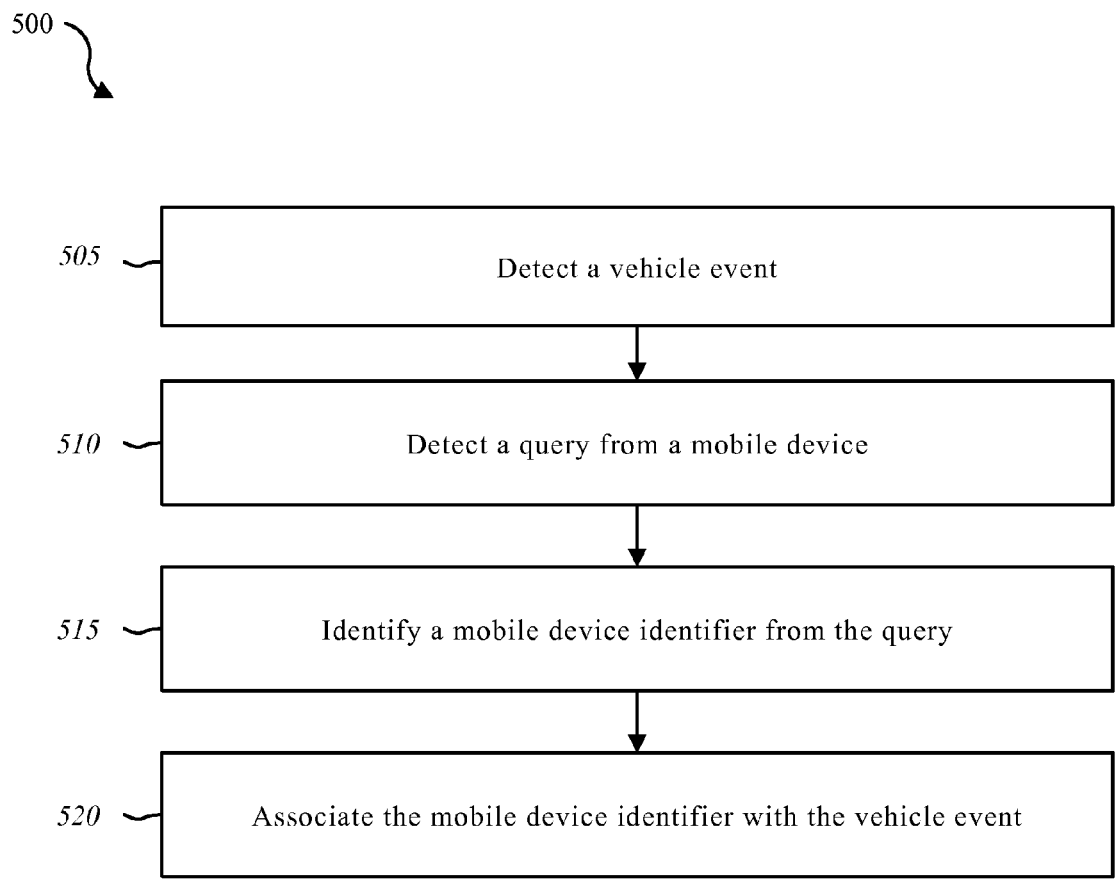
FIG. 5 is a flow diagram illustrating one embodiment of a method for monitoring vehicle usage.

FIG. 5 is a flow diagram illustrating one embodiment of a method 500 for monitoring vehicle usage. In some configurations, the method 500 may be implemented by the vehicle monitoring module 145 illustrated in FIG. 1 or 2. In some configurations, the method 500 may be implemented in conjunction with the application 140 and/or the user interface 135 illustrated in FIG. 1.

At block 505, a vehicle event may be detected. The vehicle event may include any combination of vehicle speed, vehicle acceleration, vehicle deceleration, vehicle braking, vehicle gravitational force (g-force), vehicle seat belt use, distance traveled, engine performance, vehicle occupancy, and vehicle location. The vehicle event may be detected in conjunction with an on-board diagnostic (OBD) connector. At block 510, a query from a mobile device may be detected. The query may include a Wi-Fi probe request or Bluetooth inquiry. At block 515, a mobile device identifier may be identified from the query. The mobile device identifier may include any combination of a device serial number, IMEI number, MEID number, CDN identifier, ICCID, Wi-Fi MAC address, BLUETOOTH® MAC address, BLUETOOTH® global identifier, carrier information, mobile device model information, and a list of SSIDs. At block 520, the mobile device identifier may be associated with the vehicle event.

Figure 6:
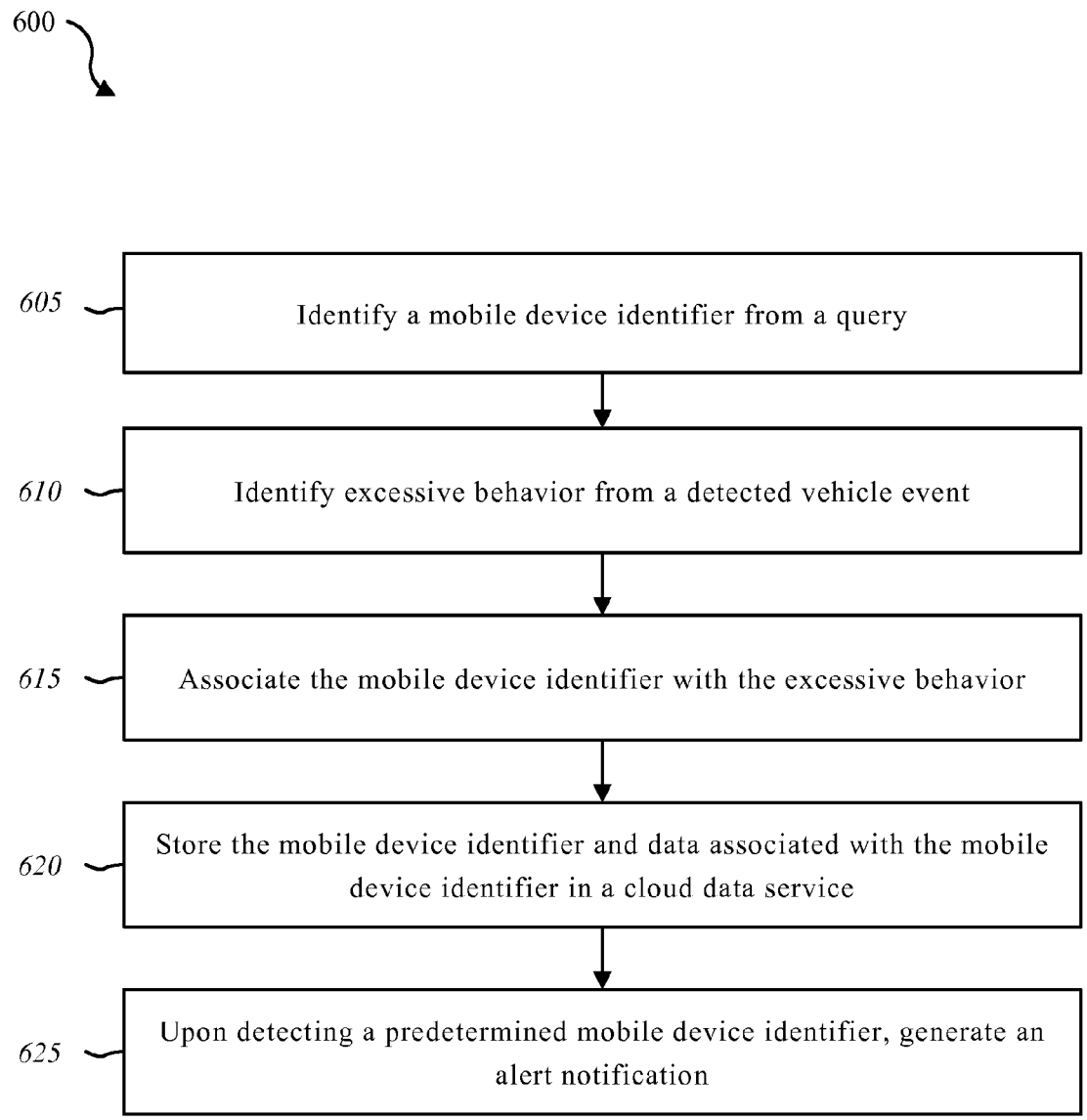
FIG. 6 is a flow diagram illustrating one embodiment of a method for monitoring vehicle usage.

FIG. 6 is a flow diagram illustrating one embodiment of a method 600 for monitoring vehicle usage. In some configurations, the method 600 may be implemented by the vehicle monitoring module 145 illustrated in FIGS. 1 and/or 2. In some configurations, the method 600 may be implemented in conjunction with the application 140 and/or the user interface 135 illustrated in FIG. 1.

At block 605, a mobile device identifier may be identified from a query. At block 610, excessive behavior may be identified from a detected vehicle event. The excessive behavior may include any combination of satisfying a speed threshold, satisfying an acceleration threshold, satisfying a deceleration threshold, satisfying a braking threshold, satisfying a g-force threshold, satisfying a revolutions per minute (RPM) threshold, and satisfying an audio system volume threshold. At block 615, the mobile device identifier may be associated with the excessive behavior. At block 620, the mobile device identifier and data associated with the mobile device identifier may be stored in a cloud data service. At block 625, upon detecting a predetermined mobile device identifier, an alert notification may be generated. In some cases, an operation of the vehicle may be altered as a result of detecting the predetermined mobile device identifier.

Figure 7:
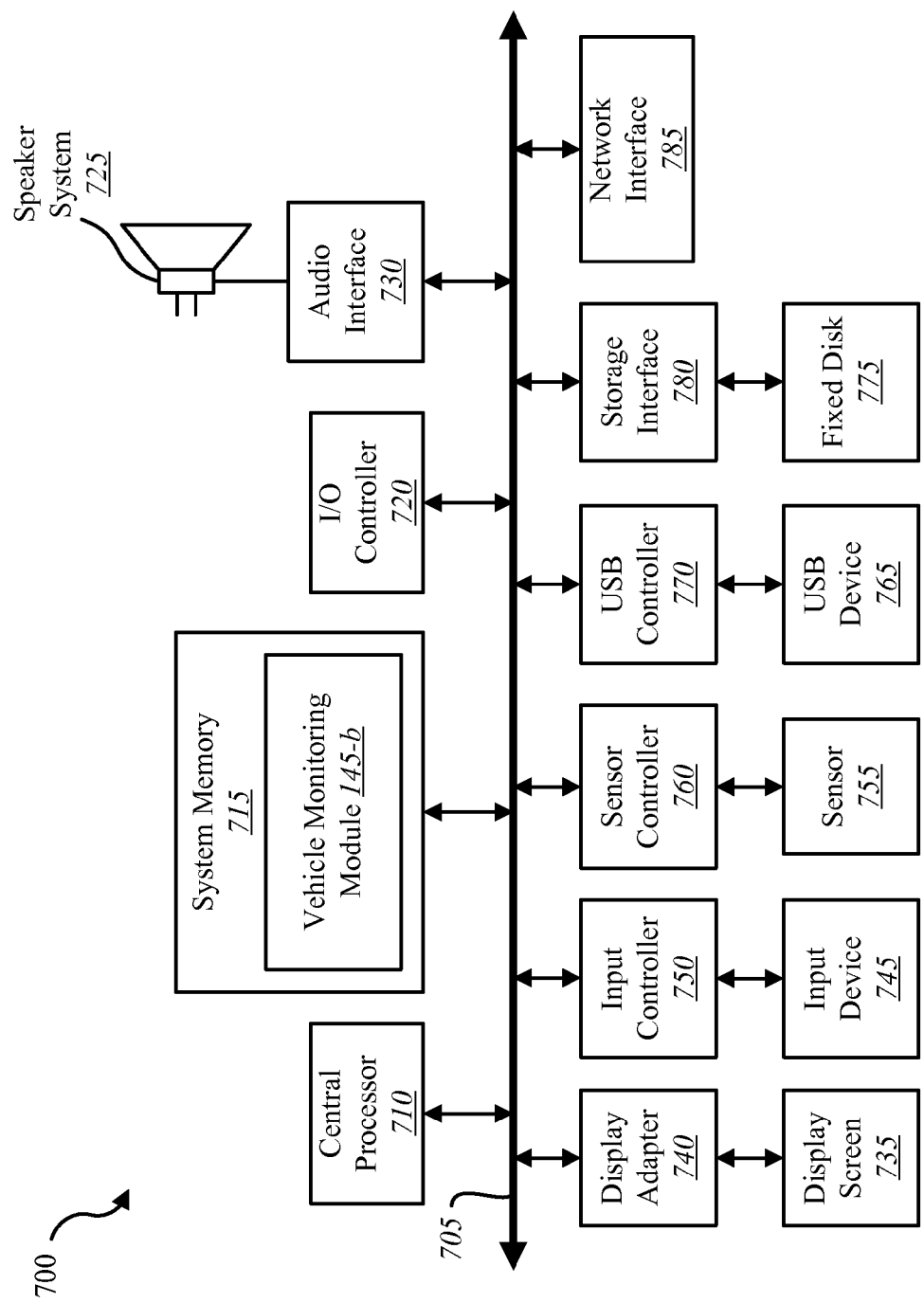
FIG. 7 depicts a block diagram of a computer system suitable for implementing the present systems and methods.

FIG. 7 depicts a block diagram of a controller 700 suitable for implementing the present systems and methods. The controller 700 may be an example of device 105, computing device 150, and/or automation controller 155 illustrated in FIG. 1. In one configuration, controller 700 includes a bus 705 which interconnects major subsystems of controller 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), multiple USB devices 765 (interfaced with a USB controller 770), and a storage interface 780. Also included are at least one sensor 755 connected to bus 705 through a sensor controller 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the vehicle monitoring module 145-b to implement the present systems and methods may be stored within the system memory 715. Applications (e.g., application 140) resident with controller 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of controller 700, can connect to a standard computer readable medium for storage and/or retrieval of information, such as a fixed disk drive 775. Fixed disk drive 775 may be a part of controller 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 700 wirelessly via network interface 785.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk 775. The operating system provided on controller 700 may be iOS®, ANDROID®, MS-DOS®, MS-WINDOWS®, OS/2®, UNIX®, LINUX® or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for monitoring events within a vehicle, comprising:
    detecting, by a processor, a vehicle event;
    detecting, by the processor, a query from a first mobile device and a second mobile device, the queries each comprising a Wi-Fi probe request or Bluetooth inquiry;
    identifying, by the processor, a mobile device identifier from each of the queries; and
    associating, by the processor, each of the mobile device identifiers with the vehicle event.

2. The method of claim 1, wherein the mobile device identifier includes any combination of a device serial number, international mobile equipment identity (IMEI) number, mobile equipment identifier (MEID), cellular data number (CDN), integrated circuit card identifier (ICCID), Wi-Fi media access control (MAC) address, BLUETOOTH® MAC address, BLUETOOTH® global identifier, carrier information, mobile device model information, and a list of service set identifiers (SSIDs).

3. The method of claim 1, wherein the vehicle event comprises any combination of vehicle speed, vehicle acceleration, vehicle deceleration, vehicle braking, vehicle gravitational force (g-force), vehicle seat belt use, distance traveled, engine performance, vehicle occupancy, and vehicle location.

4. The method of claim 1, further comprising:
    determining, by the processor, whether the first mobile device is within the vehicle, wherein determining whether the first mobile device is within the vehicle comprises any combination of satisfying a quantity of queries threshold, satisfying a query timing threshold, and satisfying a signal strength threshold.

5. The method of claim 1, further comprising:
    identifying, by the processor, excessive behavior from the vehicle event, the excessive behavior comprising any combination of satisfying a speed threshold, satisfying an acceleration threshold, satisfying a deceleration threshold, satisfying a braking threshold, satisfying a g-force threshold, satisfying a revolutions per minute (RPM) threshold, and satisfying an audio system volume threshold.

6. The method of claim 5, further comprising:
associating, by the processor, each of the mobile device identifiers with the excessive behavior.

7. The method of claim 1, further comprising:
associating, by the processor, each of the mobile device identifiers with an identity of a vehicle occupant.

8. The method of claim 1, further comprising:
upon detecting a predetermined mobile device identifier, by the processor, altering an operation of the vehicle and generating an alert notification.

9. The method of claim 1, wherein the vehicle event is detected in conjunction with an on-board diagnostic (OBD) connector.

10. The method of claim 1, further comprising:
storing, by the processor, the mobile device identifier and data associated with the mobile device identifier in a cloud data service, wherein the mobile device identifier and associations of the mobile device identifier are communicated to the cloud data service via a cellular link.

11. A computing device configured for monitoring vehicle usage within a vehicle, comprising:
a processor;
memory in electronic communication with the processor, wherein the memory stores computer executable instructions that when executed by the processor cause the processor to perform the steps of:
receiving a vehicle event history;
detecting a vehicle event;
detecting a query from a mobile device, the query comprising a Wi-Fi probe request or Bluetooth inquiry;
identifying a mobile device identifier from the query;
associating the mobile device identifier with the vehicle event; and
generating an alert notification based at least in part on the vehicle event history and the association.

12. The computing device of claim 11, wherein the mobile device identifier includes any combination of a device serial number, international mobile equipment identity (IMEI) number, mobile equipment identifier (MEID), cellular data number (CDN), integrated circuit card identifier (ICCID), Wi-Fi media access control (MAC) address, BLUETOOTH® MAC address, BLUETOOTH® global identifier, carrier information, mobile device model information, and a list of service set identifiers (SSIDs).

13. The computing device of claim 11, wherein the vehicle event comprises any combination of vehicle speed, vehicle acceleration, vehicle deceleration, vehicle braking, vehicle gravitational force (g-force), vehicle seat belt use, distance traveled, engine performance, vehicle occupancy, and vehicle location.

14. The computing device of claim 11, wherein the instructions executed by the processor cause the processor to perform the steps of:
determining whether the mobile device is within the vehicle, wherein determining whether mobile device is within the vehicle comprises any combination of satisfying a quantity of queries threshold, satisfying a query timing threshold, and satisfying a signal strength threshold.

15. The computing device of claim 11, wherein the instructions executed by the processor cause the processor to perform the steps of:
identifying excessive behavior from the vehicle event, the excessive behavior comprising any combination of satisfying a speed threshold, satisfying an acceleration threshold, satisfying a deceleration threshold, satisfying a braking threshold, satisfying a g-force threshold, satisfying a revolutions per minute (RPM) threshold, and satisfying an audio system volume threshold.

16. The computing device of claim 15, wherein the instructions executed by the processor cause the processor to perform the steps of:
associating the mobile device identifier with the excessive behavior.

17. The computing device of claim 11, wherein the instructions executed by the processor cause the processor to perform the steps of:
upon detecting the predetermined mobile device identifier, altering an operation of the vehicle and generating an alert notification.

18. The computing device of claim 11, wherein the instructions executed by the processor cause the processor to perform the steps of:
storing the mobile device identifier and data associated with mobile device identifier in a cloud data service, wherein the mobile device identifier and associations of the mobile device identifier are communicated to the cloud data service via a cellular link.

19. A non-transitory computer-readable storage medium storing computer executable instructions that when executed by a processor cause the processor to perform the steps of:
detecting a vehicle event;
detecting a query from a first mobile device and a second mobile device, the queries each comprising a Wi-Fi probe request or Bluetooth inquiry;
identifying a mobile device identifier from each of the queries;
associating the mobile device identifiers with the vehicle event; and
determining whether the first mobile device is within the vehicle by at least one of satisfying a quantity of queries threshold, satisfying a query timing threshold, and satisfying a signal strength threshold.

20. The computer-program product of claim 19, wherein the mobile device identifier includes any combination of a device serial number, international mobile equipment identity (IMEI) number, mobile equipment identifier (MEID), cellular data number (CDN), integrated circuit card identifier (ICCID), Wi-Fi media access control (MAC) address, BLUETOOTH® MAC address, BLUETOOTH® global identifier, carrier information, mobile device model information, and a list of service set identifiers (SSIDs).

* * * * *